United States Patent [19]

Gutierrez

[11] Patent Number: 5,706,084
[45] Date of Patent: Jan. 6, 1998

[54] MODULATED SOURCE INTERFEROMETRY WITH COMBINED AMPUTUDE & FREQUENCY MODULATION

[75] Inventor: Roman C. Gutierrez, La Crescenta, Calif.

[73] Assignee: The United States of America as represented by the Administrator of the National Aeronautics and Space Administration, Washington, D.C.

[21] Appl. No.: 841,478

[22] Filed: Apr. 22, 1997

Related U.S. Application Data

[63] Continuation of Ser. No. 530,386, Sep. 14, 1995, abandoned.
[51] Int. Cl.⁶ .................................................. G01B 9/02
[52] U.S. Cl. ........................ 356/351; 356/349; 356/358
[58] Field of Search ............................. 356/345, 351, 356/358, 349, 346

[56] References Cited

U.S. PATENT DOCUMENTS

| 5,245,408 | 9/1993 | Cohen | 356/351 |
| 5,539,520 | 7/1996 | Telle | 356/351 |

*Primary Examiner*—Frank G. Font
*Assistant Examiner*—Robert Kim
*Attorney, Agent, or Firm*—John H. Kusmiss

[57] ABSTRACT

An improved interferometer is produced by modifying a conventional interferometer to include amplitude and/or frequency modulation of a coherent light source at radio or higher frequencies. The phase of the modulation signal can be detected in an interfering beam from an interferometer and can be used to determine the actual optical phase of the beam. As such, this improvement can be adapted to virtually any two-beam interferometer, including, for example, Michelson, Mach-Zehnder, and Sagnac interferometers. The use of an amplitude modulated coherent light source results in an interferometer that combines the wide range advantages of coherent interferometry with the precise distance measurement advantages of white light interferometry.

17 Claims, 6 Drawing Sheets

MODULATED SOURCE INTERFEROMETRY WITH COMBINED AMPUTUDE & FREQUENCY MODULATION

This application is a continuation of application Ser. No. 08/530,386, filed Sep. 14, 1995, now abandoned.

ORIGIN OF THE INVENTION

The invention described herein was made in the performance of work under a NASA contract, and is subject to the provisions of Public Law 96-517 (35 U.S.C. §202) in which the Contractor has elected not to retain title.

TECHNICAL FIELD

The invention is in the technical field of optical interferometry and, more specifically, relates to an improved method of interferometry wherein a coherent light beam is modulated in amplitude and/or frequency before entering an interferometer allowing differential phase measurements of modulation side bands at the modulation frequency, thereby resulting in improved measurements which combine the advantages of white light interferometry with those of monochromatic source interferometry.

BACKGROUND ART

Optical interferometry is a well-known branch of optical sciences in which the constructive and destructive interference between two light beams is used to measure the effective pathlength difference of the optical path through which the light beams have passed.

For the purpose of interferometry light is viewed as a wave phenomenon. A propagating wavefront of light consists of rapidly alternating, mutually orthogonal electric and magnetic fields. Two light beams can interfere if they are the same frequency (wavelength) and if the electric and magnetic vectors of the beams are in identical planes (i.e., the light is identically plane polarized). When two beams are combined in phase, the maxima and minima of alternating fields exactly line up and add together (constructively interfere) to form a brighter beam. When two correctly polarized beams that are 180 degrees out of phase are combined, the maxima and minima of the fields subtract from each other (destructively interfere) and result in a dimmer beam.

In an interferometer two beams of light, generally from the same source, are allowed to travel over two separate optical paths (arms). One of the beams of light is usually considered the "reference" beam traveling through the reference arm of the interferometer. This beam is the "original" beam that undergoes no change in pathlength. The second or "signal" beam traverses the signal arm and is then combined with the reference beam, and the effective pathlength difference between the two arms is determined by measuring the interference.

The effective pathlength is actually a measurement of the phase relationships between the two light beams. If the two pathlengths are exactly the same, the beams will be exactly in phase with each other and interfere constructively (add together), resulting in a brighter beam. However, as the effective pathlength of the signal arm is gradually increased (or decreased), the two beams will become more and more out of phase with maximum interference occurring when the phase difference is 180 degrees. Thereafter, the interference will decrease until the beams add perfectly at 360 degrees pathlength difference, where they are perfectly in phase.

If the media through which the two beams propagate is exactly the same, then the effective pathlength difference will represent actual distance. If the wavelength of a beam is 500 nm (green light), then maximal interference will occur when the length difference between the paths is one-half the wavelength (250 nm). Thus, if the interferometer is first aligned and balanced (beams exactly in phase) and the length of the signal path is changed, when the change in pathlength reaches 250 nm (or multiples thereof) the strength of the recombined beams will be minimal.

Only accurate length measurement on the order of less than one wavelength can be made because 180 degrees of phase difference looks like 360 degrees, looks like 540 degrees, etc. In other words, successive multiples of the one-half wavelength pathlength difference cannot be distinguished, making absolute length measurements impossible.

Alternatively, the physical pathlength may remain constant while the medium through which the signal beam propagates varies. In that case, the effective change in pathlength will actually represent changes in the index of refraction of the signal path. Thus, the measurement can be used to determine the index of refraction of an unknown or to measure some other factor such as temperature or pressure that affects the index of refraction.

A generalized mathematical treatment of interferometry can be employed to understand the current invention as it relates to the prior art. A first step in deriving a general expression for the irradiance resulting from the interference of two light beams is to express the electric fields of copropagating plane waves delayed relative to each other by a phase proportional to a path difference $\Delta x$. The electric field of the first plane wave is given by:

$$E_1 = A \int_{-\infty}^{+\infty} e^{ikx} e^{i\omega t} S_1(\omega) d\omega \quad (1)$$

where $S_1(\omega)$ is the spectrum, $\omega$ is the frequency in rad/s, $k$ is the wave number in rad/m, and $A$ is the amplitude of the electric field. Distance along the direction of propagation is given by $x$ while $t$ is time.

Similarly, the electric field of the second wave is given by:

$$E_2 = B \int_{-\infty}^{+\infty} e^{ik(x+\Delta x)} e^{i\omega t} S_2(\omega) d\omega \quad (2)$$

where $S_2(\omega)$ is the spectrum of the second wave, $B$ is the amplitude of the electric field, and $\Delta x$ is the path difference.

The combined electric field is given by the sum of the two equations (1) and (2):

$$E_t = E_1 + E_2 = \int_{-\infty}^{+\infty} (AS_1(\omega) + BS_2(\omega) e^{i\frac{\omega}{c}\Delta x}) e^{i\frac{\omega}{c}x} e^{i\omega t} d\omega \quad (3)$$

The optical intensity (I) resulting from this electric field is then given by:

$$I_t = E_t E_t^* = \int_{-\infty}^{+\infty} \int_{+\infty}^{-\infty} (AS_1(\omega) + BS_2(\omega) e^{i\frac{\omega}{c}\Delta x})$$
$$(AS_1^*(\omega') + BS_2^*(\omega') e^{-i\frac{\omega'}{c}\Delta x}) e^{i\frac{\omega}{c}x} e^{-i\frac{\omega'}{c}x} e^{i\omega t} e^{-i\omega' t} \cdot d\omega \cdot d\omega' \quad (4)$$

Which gives the following by expanding the multiplication while ignoring the time-independent common phase term:

$$I_t = \int_{-\infty}^{+\infty}\int_{-\infty}^{+\infty} [(A^2 S_1(\omega)S_1^*(\omega') + B^2 S_2(\omega)S_2^*(\omega')e^{i\frac{\Delta x}{c}(\omega-\omega')}) + \quad (5)$$

$$AB(S_2(\omega)S_1^*(\omega')e^{i\frac{\omega}{c}\Delta x} + S_1(\omega)S_2^*(\omega')e^{-i\frac{\omega'}{c}\Delta x})] \cdot e^{i t(\omega-\omega')} \cdot d\omega \cdot d\omega'$$

Expression (5) gives an explicitly time dependent expression of the irradiance and is valid for any spectra $S_1$ and $S_2$. Therefore, equations for both white light and monochromatic interferometry may be derived from equation (5). Equation (5) can also be used to derive equations for interferometry using a modulated single mode laser. In the coherent regime (i.e., $t<<t_{coherence}$ in equation (5)), the spectrum of a single mode laser may be expressed as a delta-function. Modulating the laser generates, in general, a comb of delta functions spaced by the modulation frequency $\omega_m$.

Therefore, $S_1(\omega)$ and $S_2(\omega)$ are given by:

$$S_1(\omega) = \sum_{n=-\infty}^{+\infty} a_n \delta(\omega - \omega_0 - n\omega_m) \quad (6)$$

$$S_2(\omega) = \sum_{m=-\infty}^{+\infty} b_m \delta(\omega - \omega_0 - m\omega_m) \quad (7)$$

A complex expression for the intensity variations at $\omega_m$ (equation (8)) can then be obtained by filtering equation (5) at $\omega_m$ with a filter function $f(t)$.

$$I_{\omega_m} = \int_{-\infty}^{+\infty} I_t(t) f(t) e^{-i\omega_m t} dt \quad (8)$$

Plugging equation (5) into equation (8), and using equations (6) and (7) gives:

$$I_{\omega_m} = \sum_{m=-\infty}^{+\infty}\sum_{n=-\infty}^{+\infty} [(A^2 a_n a_m^* + B^2 b_n b_m^* e^{i\frac{\Delta x}{c}(n-m)\omega_m}) + \quad (9)$$

$$AB(b_n a_m^* e^{i\frac{\Delta x}{c}(\omega_0+n\omega_m)} + a_n b_m^* e^{-i\frac{\Delta x}{c}(\omega_0+m\omega_m)})] \cdot$$

$$\left\{ \int_{-\infty}^{+\infty} e^{i t(n-m-1)\omega_m} f(t) dt \right\}$$

If we assume that the integration time of the filter is long enough to approximate the quantity in curly brackets as a Kronecker delta function (i. e., $f(t)$ is equal to 1 for all t), equation (9) simplifies to:

$$I_{\omega_m} = \sum_{n=-\infty}^{+\infty} [(A^2 a_n^* a_{n+1} + B^2 b_n^* b_{n+1} e^{i\frac{\Delta x}{c}\omega_m}) + \quad (10)$$

$$AB(a_n^* b_{n+1} e^{i\frac{\omega_0+(n+1)\omega_m}{c}\Delta x} + b_n^* a_{n+1} e^{-i\frac{\omega_0+n\omega_m}{c}\Delta x})]$$

The first term in equation (10) is derived from the beating of each spectrum with itself. Its phase depends only on the phase at $\omega_m$. The second term, or interference term which originates from the beating between the two different spectra, then depends on the optical phase ($\omega_0 \Delta x/c$).

To this point we have discussed the interference of monochromatic plane polarized light because it is relatively easy to detect interference with such light. This makes plane polarized monochromatic light ideal for measurements of index of refraction, etc. However, because it is difficult or impossible to tell the difference between successive phase cycles (i.e., 180, 360, 540, 900, etc. degrees out of phase) these interferometers are not very useful for absolute distance measurements.

However, there are interferometric methods that allow absolute distance measurements, albeit with certain severe limitations. If an interferometer is set up to work with a white light source and the two pathlengths are exactly equivalent in effective pathlength, a slight departure from perfect equivalence of pathlength causes a discernable interference effect (i.e., interference fringes can be seen when the paths are closely balanced). However, when the pathlength distance is much greater than the speed of light divided by the spectral width of the light source, this effect vanishes.

A second method of achieving precise interferometric distance measurements is heterodyne interferometry. Here different wavelengths of coherent (laser) light are used for the reference beam and the signal beam. Typically a laser is made to produce two different frequencies, either by placing the laser cavity in a magnetic field or by passing the laser beam through an acousto-optic frequency shifter.

With a heterodyne interferometer the beat frequency produced by the recombination of the two beams is altered by changes to the effective pathlength of the signal arm. The greater the frequency difference between the beams, the greater the frequency change caused by a given pathlength variation. In addition, synchronous detectors can be used to eliminate much signal noise and to largely eliminate intensity effects.

The equations developed above can also be employed to explain heterodyne interferometry. For example, equation (10) can be further simplified by assuming that each of the two interfering spectra do not contain any frequency components separated by exactly $\omega_m$. This would cause the first term in equation (10) to become zero leaving the complex intensity at $\omega_m$ as:

$$I_{\omega_m} = \sum_{n=-\infty}^{+\infty} [AB(a_n^* b_{n+1} e^{i\frac{\omega_0+(n+1)\omega_m}{c}\Delta x} + b_n^* a_{n+1} e^{-i\frac{\omega_0+n\omega_m}{c}\Delta x})] \quad (11)$$

Since two distinct frequencies are used for the reference and signal arms of the heterodyne interferometer, the coefficients in equations (6) and (7) are given by:

$$a_n = \begin{cases} 1 \text{ if } n = 1 \\ 0 \text{ otherwise} \end{cases} \text{ and } b_n = \begin{cases} 1 \text{ if } n = 0 \\ 0 \text{ otherwise} \end{cases} \quad (12)$$

Substituting equation (12) into equation (11) produces:

$$I_{\omega_m} = AB e^{i\frac{\omega_0}{c}\Delta x} \quad (13)$$

Equation (13) shows that the phase at $\omega_m$ is equal to the optical phase ($\omega_0$) modulo $2\pi$:

$$\Gamma = \frac{\omega_0 \Delta x}{c} \quad (14)$$

In other words, the phase of the signal at the beat frequency is equal to that of the optical phase. Synchronous detectors allow one to detect this frequency despite considerable noise and independent of intensity measurements. Further, this frequency is low enough that the phase can be readily measured with existing electronic devices.

However, the need to separate and manipulate two beams of different frequencies may cause additional problems. The usual solution is to separate the beams by polarizing them at mutually perpendicular axes. This adds complexity to the interferometer and introduces a potential loss of accuracy due misalignment of the polarized light beams relative to the birefringence axes of the optical components.

What is needed is a simple interferometric method that combines the ability of a monochromatic interferometer to make measurements over a wide range of signal pathlengths and that of a white light interferometer to produce absolute distance measurements.

STATEMENT OF THE INVENTION

The present invention is an improved method of interferometry which employs a modulated coherent light source. Amplitude and/or frequency modulation of the light source at radio frequencies or higher effectively broadens the laser spectrum producing readily detected sidebands. The phase difference between these sidebands is reflected in the phase of the modulation which is directly related to optical phase difference of the interferometer, thereby providing the wide measurement range of coherent source interferometry with the absolute distance measurement of white light interferometry.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an improved interferometer that operates by amplitude and/or frequency modulation of the interferometer's coherent light source followed by phase detection of the modulation in the light resulting from interference of the light beams.

The present invention consists of modifying a conventional interferometer by amplitude and/or frequency modulation of the light source at radio or higher frequencies. As will be explained below, the phase of the modulation can be detected when the two interferometer beams interfere, and this phase can be readily related to the actual optical phase of the beam resulting from the interference. As such, this improvement can be adapted to virtually any two-beam interferometer, including, for example, Michelson, Mach-Zehnder, and Sagnac interferometers. Several examples will be given, but one of ordinary skill in the art will readily realize that the current invention is not limited to the actual interferometers diagramed.

Lasers have become the coherent light sources of choice for interferometry. However, as in other monochromatic interferometry, devices using laser sources are not generally able to produce absolute distance measurements. While white light interferometry is capable of yielding precise, absolute length measurements, these measurements are limited to a very narrow range around zero pathlength difference between reference and measurement arms.

However, the problem with monochromatic sources being unable to yield absolute measurements can be largely solved by applying amplitude and/or frequency modulation to a laser light source before the laser light beams enter the interferometer. When the laser beam is modulated, the monochromatic source develops sidebands symmetrically about the center laser frequency, spaced apart by the modulating frequency. That is, if a laser is modulated at 2 MHz, there will be sidebands on both sides of the laser line spaced apart by 2 MHz.

In a sense these sidebands mean that the "monochromatic" laser is no longer monochromatic; it actually consists of a plurality of wavelengths about the center frequency of the laser. This results in interferometry with some of the advantages of both white light and monochromatic interferometry. Because the modulation does not affect the laser's coherence length, interference over a large range is possible as in a truly monochromatic system. Because there are multiple wavelengths over a relatively low frequency range (compared to light), it is possible to detect and manipulate the modulation frequency with modern high-speed electronics. This permits detection of modulation phases which can be related to actual optical phases which are at too great a frequency for detection with currently-available hardware. The determination of optical phase permits the determination of precise distance measurements over a very wide range.

Figure 1:
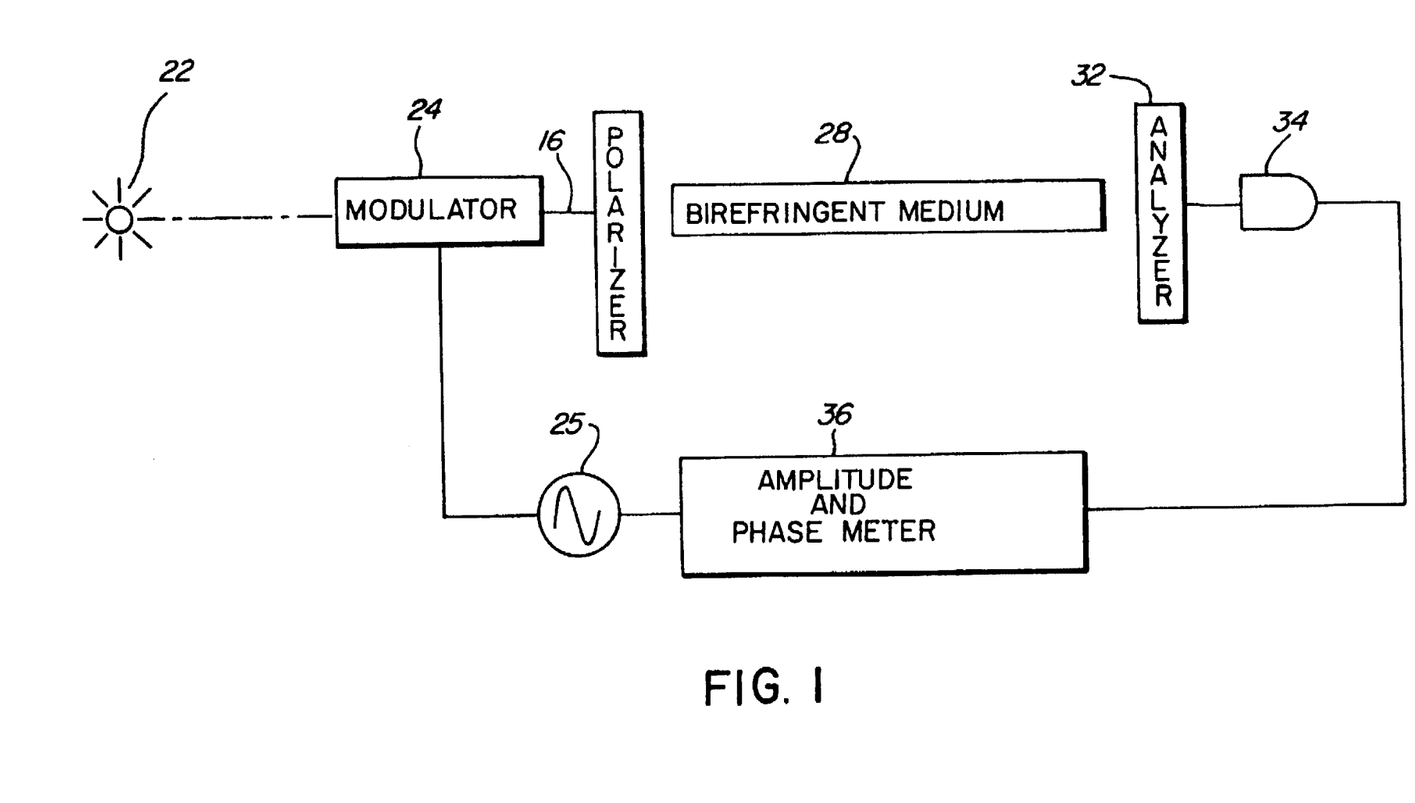
FIG. 1 illustrates the practice of the present invention with an interferometer of a first category wherein the two interferometer beams pass through the same region of space but remain separated because they are plane polarized at mutually orthogonal axes.

At a very basic level interferometry using the present invention can be separated into two fundamental categories. In a first category, as illustrated in FIG. 1, both beams of an interferometer pass through the same region of space. A reference beam 12 is separated from a signal beam 14 by having the two beams be orthogonally plane polarized.

Light from a laser source 22 is collimated and passed through an optical modulator 24, where it is amplitude and/or frequency modulated at radio or higher frequencies (generally kilohertz to GigaHertz) by a signal from an oscillator 25. A resulting modulated laser beam 16 is directed through a polarizer 26 which separates the beam into two orthogonal plane polarized beams. These are then conducted through a birefringent medium 28 such as a crystal, a liquid, an optical fiber, or a stressed isotropic material, which keeps the beams separated and introduces a phase shift between the two beams. It is this phase shift that the interferometer is intended to measure. After exiting the birefringent medium 28, the polarized light passes through a second polarizer 32 (analyzer) which recombines the orthogonal beams so that they can interfere. The interference is detected as increases and decreases of signal from a photodetector 34 which can be a photodiode, a photomultiplier, phototransistor, or other similar device with a response time suitable for the given modulation frequency. An amplitude/phase meter 36, such as a gain-phase meter, a vector voltmeter, a network analyzer or similar device, uses the output of the photodetector 34 and the oscillator 25 to determine the amplitude and the actual phase of the modulation signal derived from the interfering light.

The detected signal will be a sinusoidal signal of the same frequency as the oscillator 25 used to modulate the light source. The signal has a phase and amplitude dependent on the following factors: the optical path difference, the phase difference between the paths at the modulation frequency, and the relative intensity of the two interferometer beams at entry and at exit from the interferometer.

Figure 3:
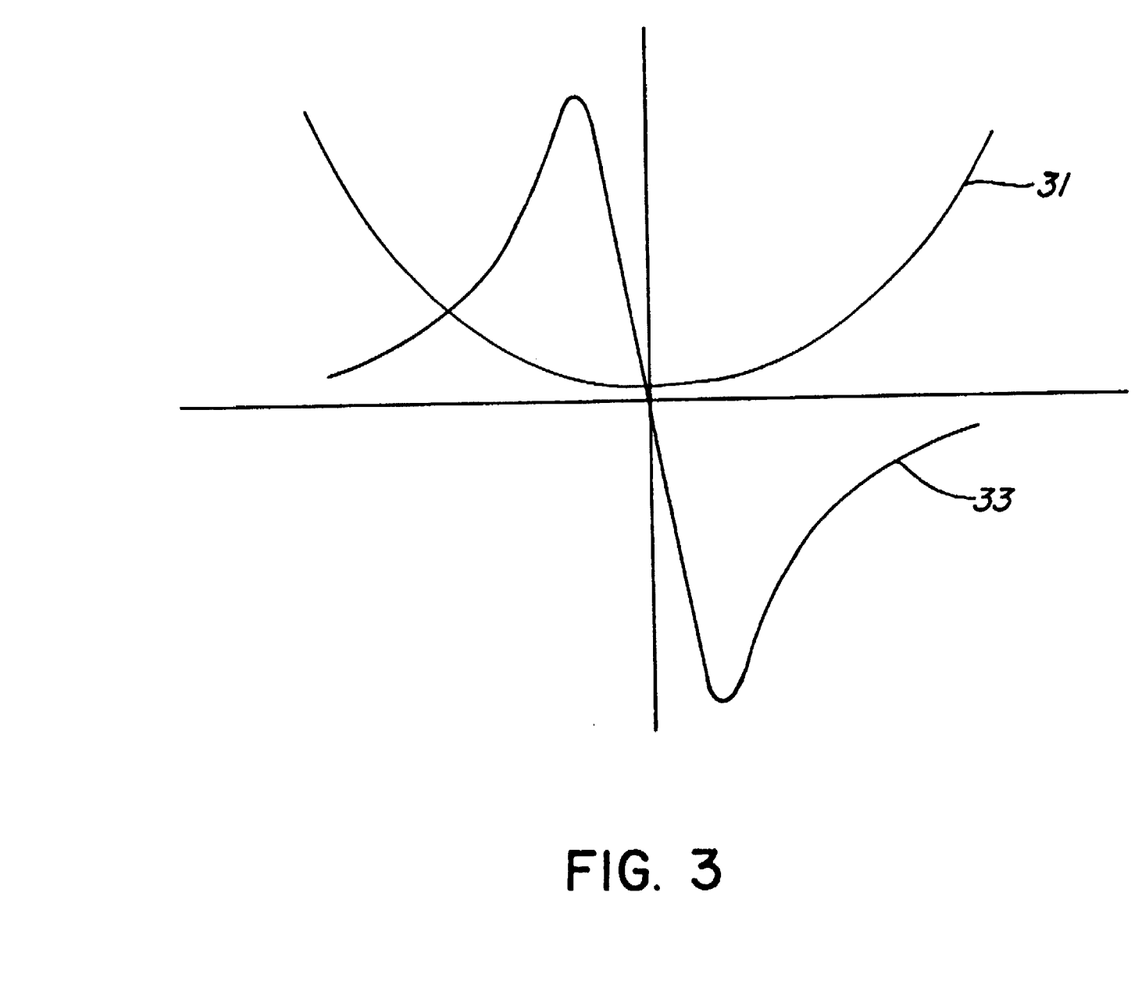
FIG. 3 illustrates a relationship between amplitude and phase in a sinusoidal signal detected from an interferometer using a modulated light source according to the present invention.

While the amplitude of the sinusoidal signal does not have a strong dependence on the optical phase difference between the two paths of the interferometer, the phase of the sinusoidal signal does. This relationship is qualitatively illustrated in FIG. 3. At the minimum of amplitude 31, phase 33 goes through a large transkion which gives the interferometer a potentially very high sensitivity.

If the interferometer is set up to be near this transition point (center of FIG. 3), a change in optical phase will dramatically change the phase of the sinusoidal signal. In this way phase changes occurring at optical frequencies can be deduced from the easily-measured phase of the radio frequency signal. As other interferometer variables are adjusted, the shape of the relationship shown in FIG. 3 changes so that the phase curve can be tailored for specific applications.

Figure 2:
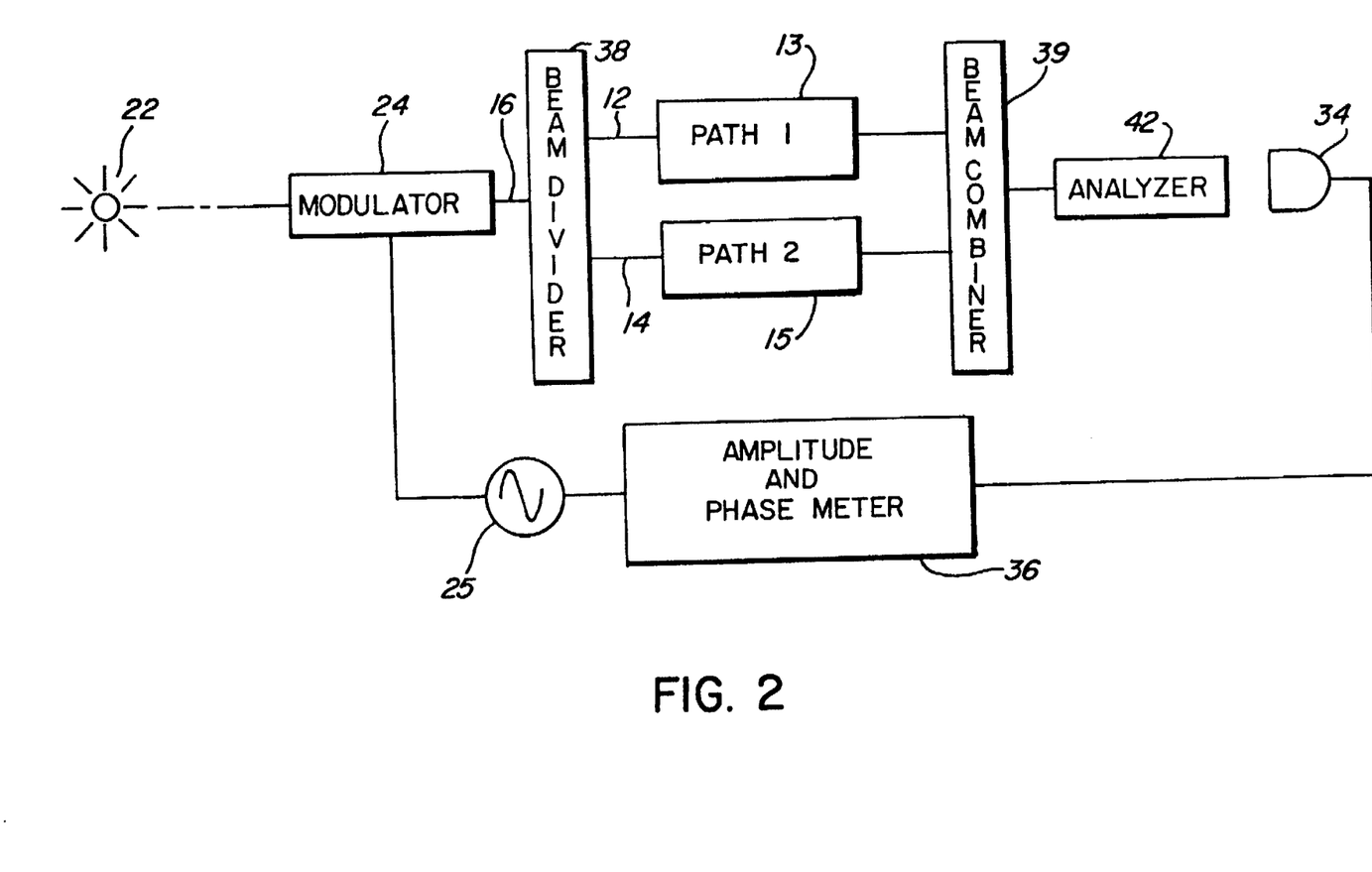
FIG. 2 illustrates the practice of the present invention with an interferometer of a second category wherein the two interferometer beams remain separated because they pass through different regions of space.

In a second category of interferometry, as illustrated in FIG. 2, the two interferometer beams pass through the different regions of space. A reference beam 12 is physically separated in space from a signal beam 14.

After collimation and modulation by the optical modulator 24 as in first category interferometry, the modulated laser beam 16 passes through a beam divider 38, where it is separated into two beams: the reference beam 12 and the signal beam 14. These beams then pass through two physically separate signal paths: the reference path 13 and the signal 15, respectively. The interferometer measures a phase change caused by a difference in refractive index or pathlength between the two paths 13, 15.

The two beams 12, 14 are recombined in a beam combiner 39. For optimal interference it may be necessary to adjust the relative intensities of the two beams 12, 14. This is done by an analyzer 42, which may be either before or after the beam combiner 39, depending on the exact configuration of the interferometer. The photodetector 34 detects the interference and the amplitude/phase meter 36 derives the phase of the modulation signal, which is precisely related to the pathlength difference in the interferometer.

The present invention also allows absolute distance measurements. At zero pathlength difference and at integer multiples of the modulation wavelength, the peak to peak variation in phase is minimized. It can also be shown that the symmetry of the phase curves shift at zero pathlength difference. By finding the points where the symmetry flips and phase variations are minimized and tuning the modulation frequency, distances can be measured with outstanding accuracy.

In addition, the sharpness of the detected phase peaks is ideal for frequency locking of lasers. Usually, lasers are locked to Fabry-Perot cavities, but alignment into, for example, a Michelson interferometer may provide a simpler system. Further, should such a system drift from the center of the phase curve, the amplitude signal can be used to regain lock. The invention can be used in first category interferometers to determine the alignment of the polarizer with the optical axes of the birefringent medium. The nonlinear dependence of phase on interferometer variables means that integration over an interferometer variable is possible. An example would be the dithering of optical phase in a optical fiber by a piezoelectric actuator. This could be a way of overcoming phase drifts caused by thermal changes in the fiber.

MATHEMATICS OF MODULATED SOURCE INTERFEROMETRY

The mathematical treatment of interferometry presented above can be used to appreciate and predict the behavior of a modulated source interferometer. Recall that equation (11) represents the situation where two different wavelengths interfere in a heterodyne interferometer. Consider, then, a slightly more complex situation where three wavelengths, two for the reference beam and one for the signal beam, are employed. In this situation equation (11) is still applicable where the following is true:

$$a_n = \begin{cases} 1 \text{ if } n = 1 \\ 0 \text{ otherwise} \end{cases} \text{ and } b_n = \begin{cases} 1 \text{ if } n = 0 \\ \epsilon \text{ if } n = -1 \\ 0 \text{ otherwise} \end{cases} \quad (15)$$

Substituting equation (15) into equation (11) produces a result quite distinct from that of the usual heterodyne interferometer:

$$I_{\omega_m} = ABe^{i\frac{\omega_m}{c}\Delta x}(e^{i\frac{\omega_0}{c}\Delta x} + \epsilon e^{-i\frac{\omega_0}{c}\Delta x}) \quad (16)$$

The phase of equation (16) ($I_{\omega m}$) in the region where the optical phase is zero or a multiple of $2\pi$ is approximately:

$$\Gamma \approx \left(\frac{1-\epsilon}{1+\epsilon}\right)\frac{\omega_0 \Delta x}{c} \quad (17)$$

In the region where equation (17) is valid, the change in $\Gamma$ for a particular change in $\Delta x$, i.e., the sensitivity of the interferometer, is controlled by the value of $\epsilon$. When $\epsilon$ is negative, i.e. the two sidebands are out of phase by 180 degrees, the sensitivity is actually better than for conventional heterodyne interferometry. Further, for $\epsilon$ equal to one in equation (17), the phase of $I_{\omega m}$ loses its dependence on the optical phase.

In modulated source interferometry equations (6) and (7) are equal, which permits the simplification of equation (10) to:

$$I_{\omega_m} = (A^2 + B^2 e^{i\frac{\Delta x}{c}\omega_m}) \sum_{n=-\infty}^{+\infty} a_n^* a_{n+1} + \quad (18)$$

$$2ABe^{i\frac{\omega_m}{2c}\Delta x} \sum_{n=-\infty}^{+\infty} \cos\left(\frac{\omega_0 + (n+1/2)\omega_m}{c}\Delta x\right) a_n^* a_{n+1}$$

Inspection of this equation indicates that the phase of $I_{\omega 7 m}$ depends strongly on optical phase only if the second summation is complex. Since the cosine is real, the second summation is complex only if the coefficients in the expansion of the spectrum are also complex. In other words, the spectral components of the source must be out of phase.

When a laser diode is current modulated, a large number of different wavelengths are generated, because such semiconductor lasers have a large chirp of anywhere between 100 and $10^6$ (the number of wavelengths produced is approximately equal to twice the chirp). That is, current modulation of a laser diode produces light that is both amplitude and frequency modulated. Furthermore, there is a lag between intensity change and frequency change, which results in the different wavelength components being out of phase. As explained with the example of three simultaneous wavelengths, the spectrum of a current modulated laser diode will show a strong dependence of the phase of $I_{\omega_m}$ the optical phase. Thus, modulated source interferometry has the same advantages of heterodyne interferometry in that the optical phase can be indirectly measured with a synchronous detector. However, modulated source interferometry has the further advantage of using the identical spectrum for both reference and signal paths.

A more complete solution for $I_{\omega_m}$ which includes both amplitude and frequency modulations as in the case of an current modulated laser diode source can be derived from the earlier presented equations. An expression for the electric field of such a modulated light source is:

$$E_1 = E_0 \sqrt{1 - m\cos(\omega_m t)} \cdot e^{j\nu \sin(\omega_m t + \phi)} e^{j(k_0 x + \omega_0 t)} \tag{19}$$

The intensity modulation can be approximated with terms up to $m^2$ of a Taylor series centered around m=0. The frequency modulation component can then be expanded as a series of Bessel functions:

$$E_1 = E_0 \left[ \left(1 - \frac{m^2}{16}\right) - \frac{m}{2} \cos(\omega_m t) - \frac{m^2}{16} \cos(2\omega_m t) \right] \sum_{n=-\infty}^{+\infty} J_n(\nu) e^{jn(\omega_m t + \phi)} \tag{20}$$

The electric field in equation (20) is a comb of delta functions as in equation (6), where:

$$a_n = \left(1 - \frac{m^2}{16}\right) J_n(\nu) e^{jn\phi} - \frac{m}{4} [J_{n-1}(\nu)e^{j(n-1)\phi} + J_{n+1}(\nu)e^{j(n+1)\phi}] - \frac{m^2}{32} [J_{n-2}(\nu)e^{j(n-2)\phi} + J_{n+2}(\nu)e^{j(n+2)\phi}] \tag{21}$$

The intensity spectrum is then given by the square of the magnitude of equation (21):

$$I_n = a_n a_n^* = \left(1 - \frac{m^2}{8}\right) J_n^2 - \frac{m}{2}(J_n J_{n-1} + J_n J_{n+1})\cos(\phi) - \frac{m^2}{16}(J_n J_{n-2} + J_n J_{n+2})\cos(2\phi) \tag{22}$$

Next, evaluation of the infinite sums in equation (18) while ignoring terms of higher order than two in m produces:

$$a_n a_{n+1}^* = \frac{m^2}{32}(2J_n J_{n+1} - J_{n-1} J_n - J_{n+1} J_{n+2})e^{j\phi} + \tag{23}$$

$$\left[ J_n J_{n+1} + \frac{m^2}{16}(J_n J_{n-1} + J_{n+1} J_{n+2} - 2J_n J_{n+1}) \right] e^{-j\phi} +$$

$$- \frac{m}{4}(J_n J_{n+2} + J_{n-1} J_{n+1}) e^{-2j\phi} +$$

$$\frac{m^2}{32}(2J_{n-1} J_{n+2} - J_n J_{n+3} - J_{n-2} J_{n+1}) e^{-3j\phi} - \frac{m}{4}(J_n^2 + J_{n+1}^2)$$

Now, using equation (23) and $$\sum_{n=-\infty}^{+\infty} J_n J_{n+N} = \begin{cases} 1 \text{ if } N=0 \\ 0 \text{ if } N \neq 0 \end{cases} \tag{24}$$

gives the first infinite summation in equation (18) as:

$$\sum_{n=-\infty}^{+\infty} a_n a_{n+1}^* = -\frac{m}{2} \tag{25}$$

Using Graf's equation together with Gegenbauer's addition theorem, the other infinite sum in equation (18) can be evaluated as:

$$\sum_{n=-\infty}^{+\infty} J_n(\nu) J_{n+N}(\nu) \frac{\cos}{\sin}(n\alpha + \phi) = J_N(\zeta) \frac{\cos}{\sin}(N\chi + \phi) \tag{26}$$

Where $$\begin{cases} \zeta = 2\nu \sin\left(\frac{\alpha}{2}\right) \\ \chi = \frac{\pi}{2} - \frac{\alpha}{2} \end{cases} \tag{27}$$

When $\Delta x$ is small, $\alpha$ is small and the indices of the Bessel functions can be shifted by a small integer without significantly changing the cosine of (26), equation (23) can be substituted into equation (26), giving the approximate result:

$$\sum_{n=-\infty}^{+\infty} \cos(n\alpha + \phi) a_n a_{n+1}^* = -\frac{m}{2} J_0(\zeta)\cos(\phi) + \tag{28}$$

$$J_1(\zeta)\cos(\chi + \phi) e^{-j\phi} - \frac{m}{4} J_2(\zeta)\cos(2\chi + \phi) e^{-2j\phi}$$

Where equation (26) and (27) hold, $$\phi = \frac{(\omega_0 + \omega_m/2)\Delta x}{c} \tag{29}$$

$$\alpha = \frac{\omega_m \Delta x}{c} \tag{30}$$

it is possible to substitute equation (25) and (28) into equation (18) to produce a final result for $I_{\omega_m}$ when a current modulated laser diode source is used in a two-beam interferometer:

$$I_{\omega_m} = (A^2 + B_2 e^{j\frac{\Delta x}{c}\omega_m})\frac{m}{2} + 2ABe^{j\frac{\omega_m}{2c}\Delta x} \tag{31}$$

$$\left[ \frac{m}{2} J_0(\zeta)\cos(\phi) - J_1(\zeta)\cos(\chi + \phi)e^{-j\phi} + \frac{m}{4} J_2(\zeta)\cos(2\chi + \phi)e^{-2j\phi} \right]$$

Figure 4:
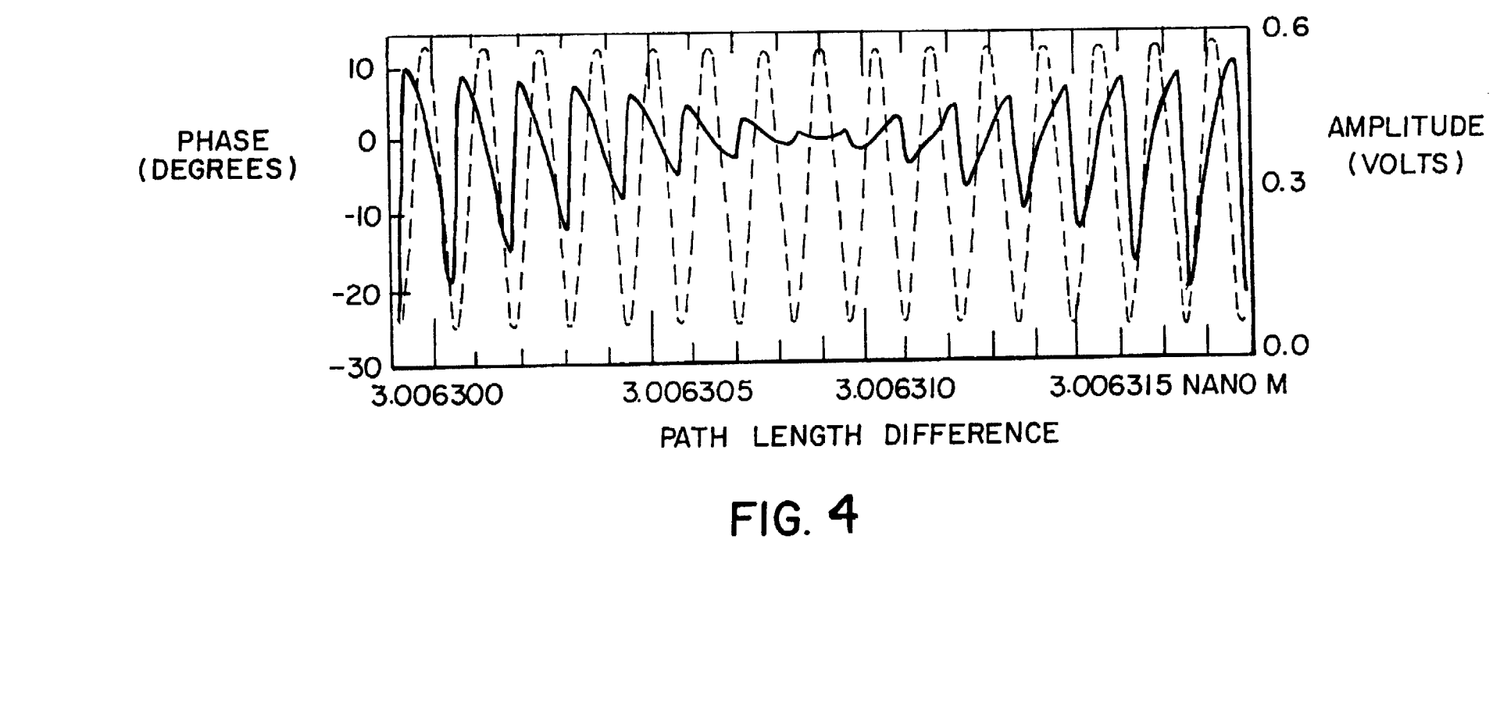
FIG. 4 illustrates an ideal relationship between phase and pathlength as calculated by equation (31)

FIG. 4 shows the calculated changes in phase ($I_{\omega_m}$) caused by pathlength differences.

EXPERIMENTAL RESULTS

Figure 5:
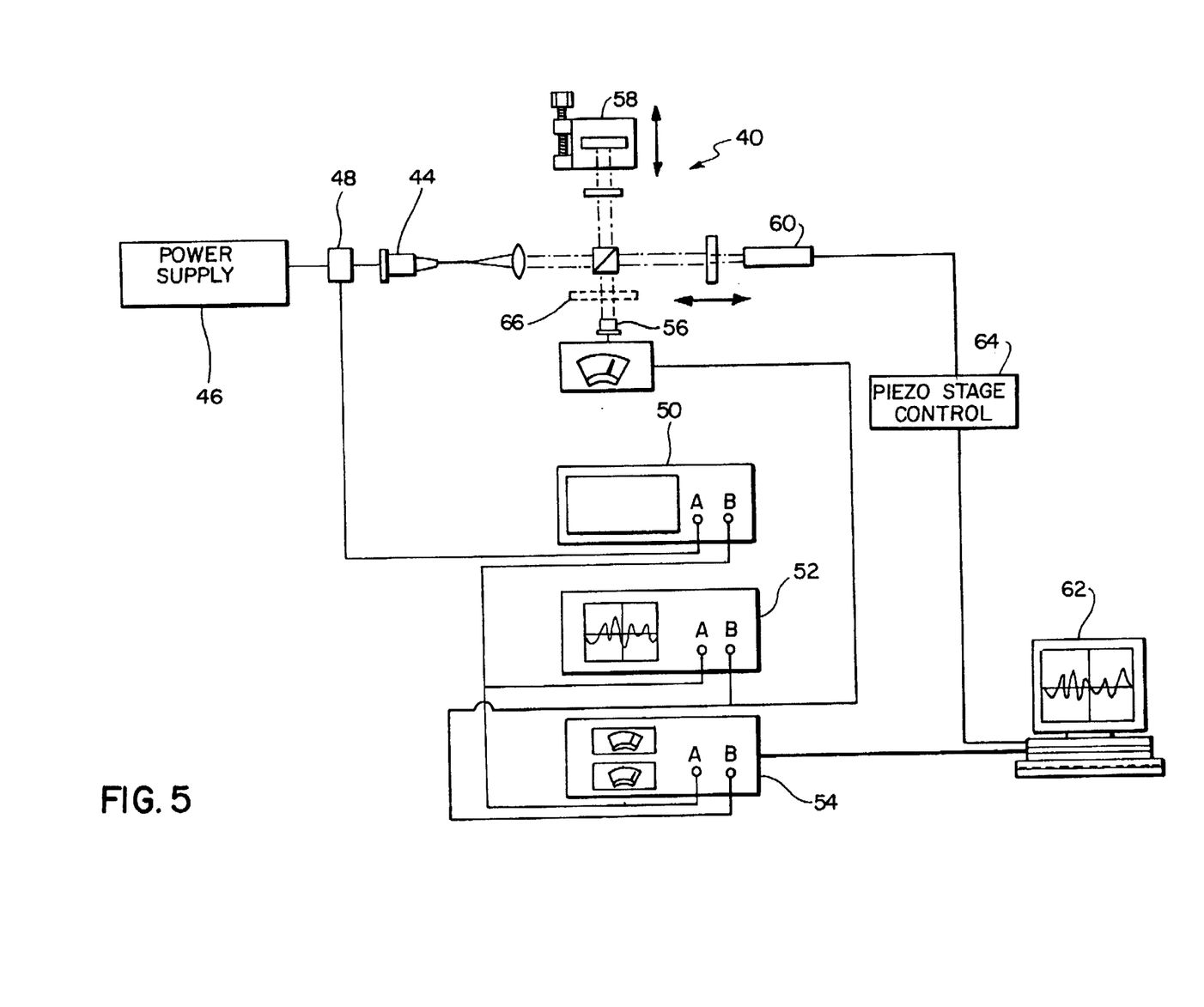
FIG. 5 illustrates an experimental setup used with a second category interferometer.

FIG. 5 shows a first experimental setup wherein a normal white light Michelson interferometer 40 is equipped with a current modulated DFB (Distributed Feedback) laser diode light source 44.

The laser diode 44 was operated at 1300 nm and was current modulated by providing a bias current from a Hewlett Packard 6216C current-limited power supply 46. An AC/DC combiner 48 received a sinusoidal voltage from a Hewlett Packard 3326A 2-channel synthesizer 50 and combined it with the output of the power supply 46 to produce an AC current at a frequency of 13 MHz. used to power the laser 44. A second channel of the synthesizer 50 was used as a reference for a Hewlett Packard 54201A digitizing oscilloscope 52 and a Hewlett Packard 8405A vector voltmeter 54. Output of a New Focus 1811 photodetector 56 with a bandwidth of 100 MHz was analyzed by the voltmeter 54 to detect the output of the Michelson interferometer 40.

The length of one arm of the interferometer 40 was coarsely adjustable with a basic translation stage 58. The length of the other arm was precision adjustable with a Queensgate piezoelectric translation stage 60 which has a travel range of 150 µm and a better than 1 nm adjustment sensitivity. A laboratory computer 62 was used to control the piezoelectric stage 60 by means of a piezo stage control 64 and to record the phase and amplitude readings from the vector voltmeter 54.

Typically, with white light interferometry one is able to estimate zero pathlength to within 1/20 of an order or about 0.04 µm. With the illustrated experimental setup the zero pathlength was determined automatically to better than 4 µm whereas conventional interferometry cannot be used to find zero pathlength at all. This result should be easily improved to less than 1 µm by improving the experimental setup. For example, preliminary tests show that with a modulation frequency of about 10 MHz, the steep portion of the phase transition curve (FIG. 3) is about 3 degrees/nm. Further, modulated source interferometry retains the basic characteristics of coherent source interferometry and can be used to determine zero pathlength difference with subnanometer accuracy once the pathlength is known within half a wavelength (0.65 µm in this case).

Figure 6:
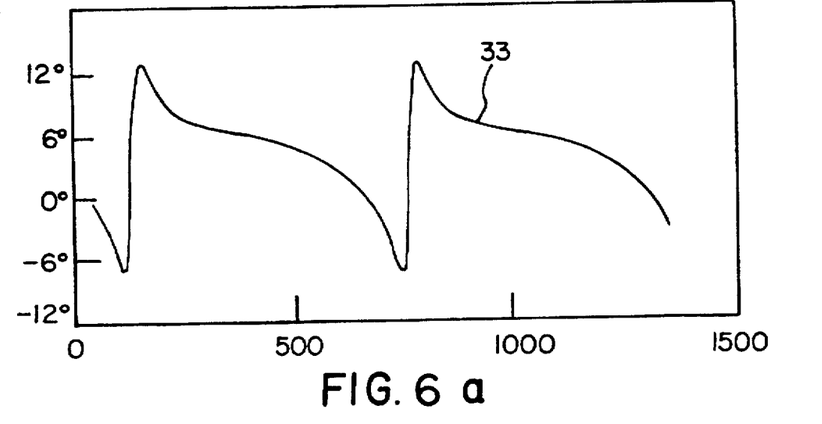
FIGS. 6a, 6b, and 6c show a plot of phase detected with the experimental setup of FIG. 5.

FIGS. 6a, 6b, and 6c illustrate the remarkable sensitivity of the detected phase to pathlength differences in the interferometer 40. The figures display detected phase (y-axis) versus position of the free translation piezoelectric stage 60 in nanometers (x-axis). The computer 62 causes the piezoelectric stage to move back and forth over a range of 1500 nm (x-axis). FIG. 5a illustrates this phase profile when the interferometer is adjusted to be on one side of the zero pathlength difference point.

Next, the coarse basic translation stage 58 is gradually moved to bring the interferometer 40 to the zero pathlength point. FIG. 5b show the results of placing the zero pathlength point 70 approximately in the center of the sweep of piezoelectric stage 60: there is a dramatic reduction of the phase amplitude change at the zero pathlength point. Jaggedness of the phase trace 33 near the zero pathlength point 70 represents noise. The real phase amplitude is near zero. FIG. 5c shows the results of moving the coarse basic translation stage 58 beyond the zero pathlength point: the phase profile is a mirror image of the profile seen in FIG. 5a. In the experiment it was easy to bring the interferometer 40 to a point of zero pathlength difference because of the inversion in the symmetry of phase profiles as one passes through zero pathlength difference.

A significant advantage of this method for automatically determining the zero pathlength point of the interferometer is that it is relatively insensitive to intensity mismatches between the two beams of the interferometer. For most methods of zero pathlength determination to work optimally it is important to have the two interferometer beams as closely matched in intensity as possible. This is because most methods are based on a determination of the amplitude changes caused by destructive or constructive interference. If the beams are significantly mismatched, the brighter beam will swamp out the amplitude changes. However, with the setup shown in FIG. 5 it is possible to insert a neutral density filter 66 as shown. Although a 0.5 neutral density filter causes the detected phase signal to show increased noise, the phase amplitude diminution as shown in FIG. 6b is still readily apparent and the accuracy of the automatic zero pathlength difference determination was not significantly impacted.

The present invention can be advantageously used in various other interferometer alignment situations. In one test, the invention was applied to align the input of polarized light through a polarization coupler into a polarization maintaining optical fiber. Any misalignment of the input light with the axes of the fiber results in a loss of extinction ratio. With the use of the present invention an excellent polarization extinction ratio of 25 dB was achieved.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. An improved method for optical interferometry comprising the following steps:

providing an optical interferometer with a coherent light source;

modulating the coherent light source with a modulating signal, at a predetermined modulation frequency, employing combined amplitude and frequency modulation, wherein the combined amplitude and frequency modulation produces a broad, asymmetric output spectrum of the coherent light source;

allowing interference to occur between modulated light beams;

detecting a synchronous interference signal in the interfering light beams, the detected interference signal having a frequency substantially equivalent to the modulation frequency;

measuring a phase of the detected interference signal as compared with a phase of the modulating signal, the phase of the detected interference signal being indicative of an optical phase of the interfering light beams, whereby a pathlength difference of the interferometer is determined.

2. The method of claim 1, wherein an amplitude of the phase of the interference signal is monitored, a zero pathlength difference being indicated by a minimum in the amplitude of the phase.

3. The method of claim 1, wherein symmetry of a phase curve of the interference signal is monitored, a zero pathlength difference being indicated by a shift in the symmetry of the phase curve.

4. The method of claim 1, wherein the interference signal detected has a frequency equal to a multiple of the modulation frequency.

5. An improved optical interferometer comprising:

means for producing coherent light;

means for generating a modulation signal;

means for modulating the coherent light with combined amplitude and frequency modulation, wherein the combined amplitude and frequency modulation produces a broad, asymmetric output spectrum of the coherent light source;

means for dividing the modulated coherent light into a reference light beam and a signal light beam;

means for ensuring separation of the reference light beam and the signal light beam as they respectively traverse a reference arm and a signal arm of the interferometer;

means for combining the reference light beam with the signal light beam allowing them to mutually interfere;

means for detecting, in the interfering light beam, a signal having a frequency substantially equivalent to that of the modulation signal;

means for measuring a phase difference between the detected interference signal and the modulation signal, the phase difference being indicative of an optical phase difference between the reference beam and the signal beam.

6. The improved interferometer of claim 5, wherein the coherent light is produced by a semiconductor diode laser, and wherein the diode laser is modulated by causing a current supply of the diode laser to vary in step with the modulation signal.

7. The improved interferometer of claim 5, wherein the modulation signal has a frequency between about 100 kHz and about 10 GHz.

8. The improved interferometer of claim 5, wherein a polarizer divides the modulated coherent light into the reference beam and the signal beam which are separated by being plane polarized at mutually orthogonal axes.

9. The improved interferometer of claim 8, wherein a second polarizer combines the reference beam with the signal beam allowing the beams to interfere with each other.

10. The improved interferometer of claim 5, wherein a photodetector with a bandwidth of between about 100 kHz and 10 GHz converts an interference between the light beams into an electrical signal.

11. The improved interferometer of claim 10, wherein a synchronous amplifier separates a portion of the electrical signal, the portion having a frequency substantially equal to that of the modulation signal.

12. The improved interferometer of claim 11, wherein a phase discrimination unit determines the phase difference between the separated electrical signal portion and the modulation signal.

13. The improved interferometer of claim 5, wherein a beam divider divides the modulated coherent light into the reference beam and the signal beam and wherein the two beams then pass, respectively, through a reference arm and a signal arm which are physically separate.

14. An improved optical interferometer comprising:

means for providing a coherent light source;

means for generating a modulation signal;

means for modulating the coherent light source with combined amplitude and frequency modulation to produce more than two anti-phase side bands;

a first polarizer for dividing the modulated coherent light into a reference light beam and a signal light beam plane polarized on mutually orthogonal axes;

an optically transparent birefringent medium conducting the polarized light beams and ensuring separation of the reference light beam and the signal light beam;

a second polarizer for combining the reference light beam with the signal light beam allowing them to mutually interfere;

a photodetector for producing an electrical signal representative of a result of the mutual interference;

means for detecting, in the electrical signal from the photodetector, a synchronous signal having a frequency substantially equivalent to that of the modulation signal;

means for measuring a phase difference between the detected synchronous signal and the modulation signal, the phase difference being indicative of an optical phase difference between the reference beam and the signal beam.

15. An improved optical interferometer which can determine absolute distances, comprising:

means for providing a single wavelength coherent light source;

means for generating a modulation signal;

means for modulating the coherent light source with combined amplitude and broadband frequency modulation, wherein the combined amplitude and frequency modulation produces a broad, asymmetric output spectrum of the coherent light source;

a beam divider for dividing the modulated coherent light into a reference light beam and a signal light beam;

a reference arm and a signal arm for providing physically separated paths for the reference light beam and signal light beam, respectively, the separated paths ensuring that the two light beams remain separated;

a beam combiner for combining the reference light beam from the reference arm with the signal light beam from the signal arm allowing the beams to mutually interfere;

a photodetector for producing an electrical signal representative of a result of the mutual interference;

means for detecting, in the electrical signal from the photodetector, a synchronous signal having a frequency substantially equivalent to that of the modulation signal;

means for measuring a phase difference between the detected synchronous signal and the modulation signal, the phase difference being indicative of an optical phase difference between the reference beam and the signal beam, wherein the optical interferometer can measure absolute distances using the single wavelength coherent light source.

16. The optical interferometer of claim 15, wherein the means for providing a coherent light source comprises a laser diode.

17. An optical interferometer which can measure absolute differences consisting of:

means for producing coherent light;

means for generating a modulation signal;

means for modulating the coherent light with combined amplitude and frequency modulation, wherein the combined amplitude and frequency modulation produces a broad, asymmetric output spectrum of the coherent light source;

means for dividing the modulated coherent light into a reference light beam and a signal light beam;

means for ensuring separation of the reference light beam and the signal light beam as they respectively traverse a reference arm and a signal arm of the interferometer;

means for combining the reference light beam with the signal light beam allowing them to mutually interfere;

means for detecting, in the interfering light beam, a signal having a frequency substantially equivalent to that of the modulation signal;

means for measuring a phase difference between the detected interference signal and the modulation signal, the phase difference being indicative of an optical phase difference between the reference beam and the signal beam.

* * * * *